(12) United States Patent
Liebich et al.

(10) Patent No.: US 7,607,737 B2
(45) Date of Patent: Oct. 27, 2009

(54) ADJUSTMENT MECHANISM

(75) Inventors: Frank Liebich, Hildesheim (DE); Christian Scheffler, Dessau (DE); Gunter Spey, Heuerssen (DE)

(73) Assignee: Faurecia Autositze GmbH, Stadthagen (DE)

(*) Notice: Subject to any disclaimer, the term of this patent is extended or adjusted under 35 U.S.C. 154(b) by 0 days.

(21) Appl. No.: 12/031,126

(22) Filed: Feb. 14, 2008

(65) Prior Publication Data
US 2008/0197686 A1 Aug. 21, 2008

(30) Foreign Application Priority Data
Feb. 14, 2007 (DE) .................. 10 2007 007 362

(51) Int. Cl.
*B60N 2/225* (2006.01)
*B60N 2/20* (2006.01)
*B60N 2/02* (2006.01)

(52) U.S. Cl. ..................................... 297/362
(58) Field of Classification Search ................. 297/362
See application file for complete search history.

(56) References Cited

U.S. PATENT DOCUMENTS

| 6,619,743 B1 * | 9/2003 | Scholz et al. ............... 297/362 |
| 6,918,635 B2 * | 7/2005 | Finner et al. ................ 297/362 |
| 7,086,699 B1 * | 8/2006 | Addison et al. ......... 297/362 X |
| 7,090,298 B2 * | 8/2006 | Lange ........................ 297/362 |
| 7,090,299 B2 * | 8/2006 | Lange ........................ 297/362 |
| 7,188,903 B2 * | 3/2007 | Finner et al. ................ 297/362 |
| 7,278,689 B2 | 10/2007 | Guillouët |
| 7,281,765 B2 * | 10/2007 | Scholz et al. ............... 297/362 |
| 7,390,061 B2 * | 6/2008 | Lange ........................ 297/362 |
| 7,461,900 B2 * | 12/2008 | Lange .................... 297/362 X |
| 7,497,519 B2 * | 3/2009 | Dill et al. ................... 297/362 |
| 7,513,573 B2 * | 4/2009 | Wahls et al. ................ 297/362 |
| 2004/0258101 A1 * | 12/2004 | Lange ........................ 370/508 |
| 2005/0211005 A1 * | 9/2005 | Lange ........................... 74/34 |
| 2005/0231017 A1 * | 10/2005 | Lange ........................ 297/374 |
| 2008/0001458 A1 * | 1/2008 | Hoshihara et al. .......... 297/362 |
| 2008/0061616 A1 * | 3/2008 | Wahls et al. ................ 297/362 |

FOREIGN PATENT DOCUMENTS

DE 102005026658 11/2006

\* cited by examiner

*Primary Examiner*—Rodney B White
(74) *Attorney, Agent, or Firm*—Kenyon & Kenyon LLP

(57) ABSTRACT

An inclination adjustment fitting for seat backs of vehicle seats includes two fitting parts that are connected in a swiveling manner relative to each other via a wobble mechanism driven by an eccentric. The eccentric is formed from an eccentric ring and two wedge segments that are arranged in mirror image and set apart from each other and that in regions cover the circumference of the eccentric ring. The wedge segments are pressed apart by a spring acting against their one end faces for increasing the eccentricity and which are capable of being acted upon against the force of the spring by driving elements between the other end faces. The spring is supported on the eccentric such that the wedge segments occupy a defined position relative to the eccentric ring.

17 Claims, 3 Drawing Sheets

ADJUSTMENT MECHANISM

CROSS-REFERENCE TO RELATED APPLICATIONS

The present application claims priority to Application No. 10 2007 007 362.5, filed in the Federal Republic of Germany on Feb. 14, 2007, which is expressly incorporated herein in its entirety by reference thereto.

FIELD OF THE INVENTION

The present invention relates to an adjustment mechanism, e.g., an inclination adjustment fitting.

BACKGROUND INFORMATION

Inclination adjustment fittings of the kind described herein have an inner and an outer toothing, which are produced, e.g., by stamping from sheet metal cuttings of the fitting parts. In this instance, the number of teeth of the outer toothing is at least one tooth less than the inner toothing, and one of the fitting parts is supported by an eccentric that is rotatable about the swivel axis, which, in turn, is supported by the other fitting part. In inclination adjustment fittings of the presently considered kind, the eccentric includes two wedge segments that are supported by an eccentric ring and are pressed apart in the sense of increasing eccentricity in the circumferential direction of the eccentric ring by an energy store, normally a spring. This prevents any play in the toothing and in the bearing. When the eccentric is actuated about the swivel axis of the inclination adjustment fitting, the inner toothing of the one fitting part rolls off on the outer toothing of the other fitting part, whereby a swivel, corresponding to the difference in the number of teeth, of the fitting part fixed on the seat back with respect to the fitting part fixed on the seat part is achieved.

The entire system is also referred to as a wobble mechanism.

In order to avoid transferring the load from the fitting part connected to the seat back to the fitting part connected to the seat part via the wedge segments, a contact cam formed on the eccentric ring protrudes into the space between the end faces of the wedge segments and in the event of an overload is used to transfer the load via a contact surface from the fitting part connected to the seat back to the fitting part connected to the seat part. Usually, the contact surface of the contact cam is situated at a small radial distance from the fitting part connected to the seat back. This distance is, on the one hand, selected such that the wedge segments in normal operation both ensure that the fitting is free from play and produce the required eccentricity for adjusting the fitting and, on the other hand, such that, in the event of an overload, the contact surface comes into contact with the fitting part attached to the seat back by deformation of fitting components such that loads from the seat back or the contact cams of the eccentric ring are fed into the seat part and from there into the body of the vehicle. The contact surface of the contact cam may be constantly in contact with the fitting part that is attached to the seat back. In this instance, there exists a so-called fixed eccentric and the wedge segments only serve to compensate a play possibly existing due to tolerances of form and position.

A problem this otherwise very reliable arrangement is that the wedge segments together with the spring pressing them apart form a component that is relatively movable with respect to the eccentric ring such that possibly an undesired displacement of the wedge segments together with the spring with respect to the eccentric ring may occur, and thus a malfunction of the entire wobble mechanism may occur.

SUMMARY

Example embodiments of the present invention provide an inclination adjustment fitting, which avoids the problems described above, which is able to be manufactured in a simple and economical manner and which may be assembled and operated with minimal effort.

According to example embodiments of the present invention, an inclination adjustment fitting for seat backs of vehicle seats is provided, having two fitting parts that are connected in a swiveling manner relative to each other via a wobble mechanism driven by an eccentric, the eccentric being formed from an eccentric ring and two wedge segments that are situated in mirror image and set apart from each other and that in regions cover the circumference of the eccentric ring, which wedge segments are pressed apart by spring device(s) acting against their one end faces for increasing the eccentricity and which are capable of being acted upon against the force of the spring device(s) by drivers between the other end faces, wherein the spring device(s) are supported on the eccentric ring such that the wedge segments occupy a defined position relative to the eccentric ring.

For this purpose, the spring device may be configured as two separate springs or as one spring having two spring shanks or spring bows, which are respectively supported on the eccentric ring or eccentric disk. A butterfly shape of the spring may be provided. However, any other shape of the spring is suitable as well as long it has a spring force appropriate for the application.

The at least one spring may be fixed on the contact cam that extends into the gap between the wedge segments.

Additional features and aspects of example embodiments of the present invention are described in more detail below with reference to the appended Figures.

DETAILED DESCRIPTION

Figure 1:
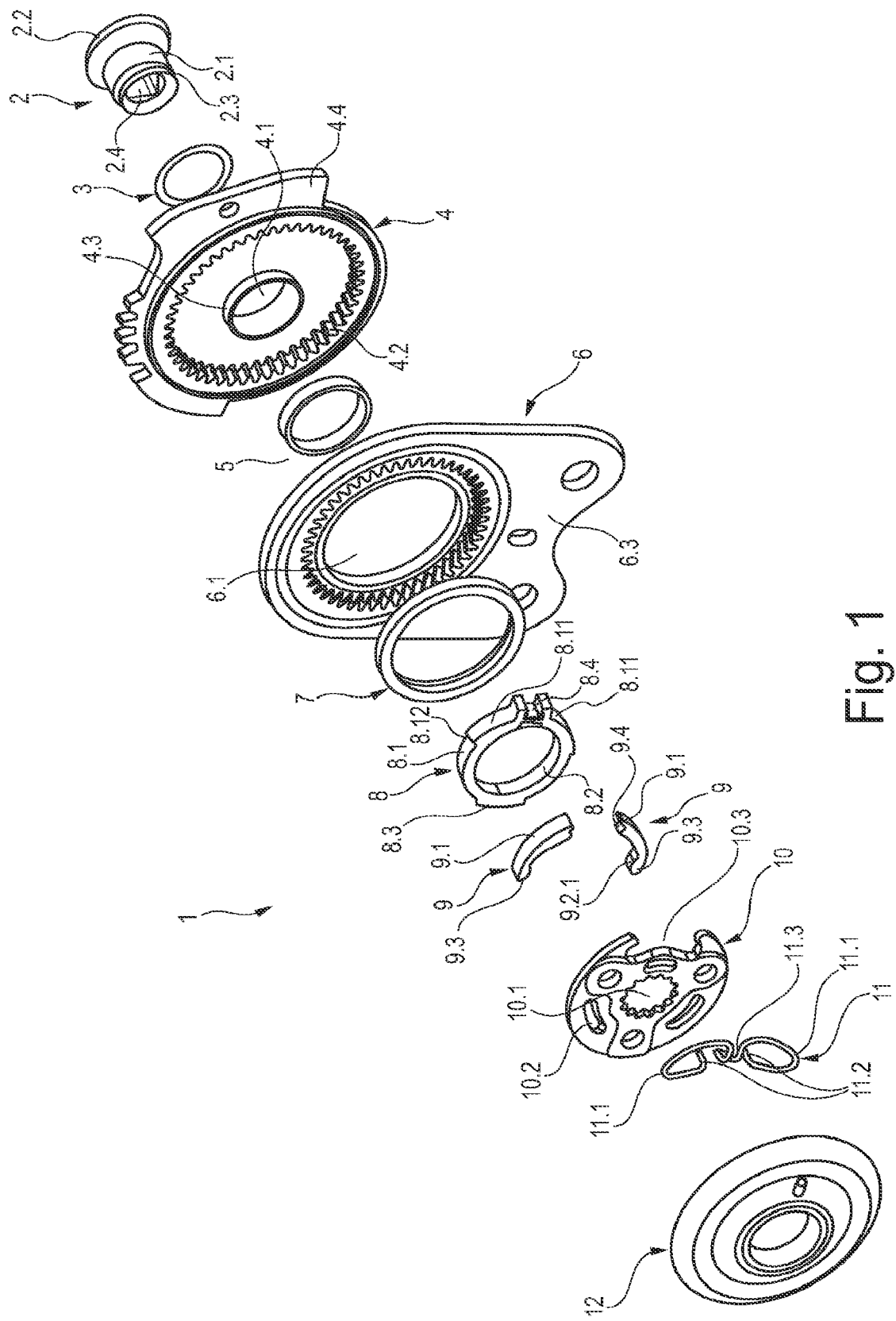
FIG. 1 is a perspective exploded view of an inclination adjustment fitting according to an example embodiment of the present invention.

The inclination adjustment fitting 1 illustrated in FIG. 1 has a driving hub 2. Driving hub 2 is made of metal and may be manufactured as a forged or cast part. Driving hub 2 includes a cylindrical center section 2.1. On one end of cylindrical center section 2.1 there is a collar 2.2 of cylindrical shape, and on the other end of cylindrical center section 2.1 there is a flange 2.3. Collar 2.2 has a greater outer diameter than cylindrical center section 2.1. Flange 2.3 has an out-of-round outer contour and is suited, together with driving disk 10, to transmit and/or support a torque by a shaft-hub connection. The out-of-round outer contour of flange 2.3 may extend in sections in a radial direction maximally to the outer surface of cylindrical center section 2.1. In the exemplary embodiment of an inclination adjustment fitting 1 illustrated in FIG. 1, flange 2.3 is constructed in the shape of a spline shaft. Any other kinds of shaft-hub connections (additional form-locking, friction-locking, integral connections, etc.) are possible as well. Driving hub 2 has in its inner region an out-of-round recess or opening 2.4 extending in the longitudinal direction, which, like flange 2.3, is a component of a shaft-hub connection and is suited to transmit and/or support a torque.

The inclination adjustment fitting includes an intermediate disk 3. Intermediate disk 3 may be slid over cylindrical center section 2.1 of driving hub 2 up to the stop, e.g., up to the inner circumferential surface of collar 2.2. Intermediate disk 3 may be made of metal.

Inclination adjustment fitting 1 includes, e.g., a conventional, fitting part 4. Fitting part 4 is attached to the seat back of a motor vehicle seat via a receiving section 4.4 constructed, e.g., in a generally conventional manner. The motor vehicle seat with the seat part and the seat back of the motor vehicle seat that is adjustable in its inclination are now shown in FIG. 1.

Fitting part 4 may be made from metal (e.g., sheet steel) and may be constructed as a stamped part in the context of a deep drawing process. Fitting part 4 has a through hole 4.1. Through hole 4.1 has a shape that is similar to cylindrical center section 2.1 of driving hub 2, e.g., a circular shape. Circular through hole 4.1 and cylindrical center section 2.1 of driving hub 2 are manufactured having an appropriate fit. In other words, in the assembled state of inclination adjustment fitting 1, cylindrical center section 2.1 of driving hub 2 extends along a region of circular through hole 4.1 or of the corresponding rim hole 4.3 of fitting part 4 that forms circular through hole 4.1. Fitting part 4, which is fixed on the seat back, has a stamped inner toothing 4.2. Inner toothing 4.2 is situated concentrically with respect to through hole 4.1 or rim hole 4.3.

A ring bearing or an inner bearing sleeve 5, which may be slid onto rim hole 4.3 of fitting part 4, is used for bearing and supporting an eccentric ring 8, which will be described in more detail below. Inner bearing sleeve 5 may be made from metal, which has a lower modulus of elasticity than the materials for fitting part 4 or eccentric ring 8.

Inclination adjustment fitting 1 illustrated in FIG. 1 furthermore has, e.g., a conventional, fitting part 6, which is attached to the seat part of the motor vehicle seat. Fitting part 6 may be made from metal (e.g., sheet steel) and may be constructed as a stamped part in the context of a deep drawing process. Fitting part 6, which is fixed on the seat part, includes a circular through hole 6.1 and a stamped outer toothing 6.2 situated concentrically with respect to circular through hole 6.1 (see, e.g., FIG. 2). Stamped outer toothing 6.2 of fitting part 6 that is fixed on the seat part has a number of teeth that is less by at least one tooth than stamped inner toothing 4.2 of fitting part 4 fixed on the seat back.

In the assembled state of inclination adjustment fitting 1, teeth of outer toothing 6.2 are engaged with teeth of inner toothing 4.2. In this state, fitting part 4 and fitting part 6 abut. The teeth of outer toothing 6.2 and the teeth of inner toothing 4.2 may have the same modulus. Just as fitting part 4, which is attached to the seat back of a motor vehicle seat, fitting part 6 also has a corresponding receiving section 6.3 for fastening fitting part 6 on the seat part of a motor vehicle seat.

As illustrated in FIG. 1, a ring bearing or an outer bearing sleeve 7 of cylindrical shape is used among other things for accommodating and supporting an eccentric 9, which will be described in more detail below.

As already mentioned, in the installed or assembled state of inclination adjustment fitting 1, eccentric ring 8 is slid onto the outer surface of inner bearing sleeve 5. Eccentric ring 8 has an eccentric ring outer surface 8.1 and an eccentric ring inner surface 8.2. Eccentric ring inner surface 8.2 is out-of-round with respect to the outer surface of inner bearing sleeve 5. This provides for not only one point of contact between the outer surface of inner bearing sleeve 5 and eccentric ring inner surface 8.2 of eccentric ring 8, which consequently would result in fitting part 4 of the seat back wobbling on fitting part 6 of the seat part.

In the inclination adjustment fitting 1, eccentric 9 includes two quarter circle wedge segments 9 situated in mirror image. Wedge segments 9 are set apart from each other and in regions cover the circumference, e.g., eccentric ring outer surface 8.1 of eccentric ring 8, in the region of outer surfaces 8.11. In the installed state, outer surfaces 9.1 of wedge segments 9 are supported by the inner surface of outer bearing sleeve 7.

Beginning at the place where a U-shaped contact cam 8.4 is located, in the region of the two outer surfaces 8.11, which are at least partially covered by inner surfaces 9.2 (see, e.g., FIG. 2) of wedge segments 9, the thickness of the wall of eccentric ring 8 increases continuously, e.g., in a wedge-shaped manner, over the circumference of eccentric ring 8. On the two ends, situated in mirror image, of maximally increased wall thickness in the radial direction on eccentric ring 8, edges 8.12 and surfaces oriented radially outward are formed by a return of the material to a smaller diameter, which are used as eccentric ring stop faces 8.13 for corresponding surfaces on wedge segments 9. For this reason, eccentric ring stop faces 8.13 are associated with wedge segment stop faces 9.21 on wedge segments 9. Wedge segment stop faces 9.21, which represent a region of inner surfaces 9.2, are a component of noses 9.3 on wedge segments 9. Each narrow end of a wedge segment 9 has a nose 9.3 pointing radially inward. The respective edges may also be rounded off and the transitions of the individual surface sections may be smooth.

Outer surfaces 9.1 of wedge segments 9 have the same curvature as inner surface of bearing sleeve 7. Thus they lie against the inner surface of outer bearing sleeve 7. In the non-driven state, there is a space between eccentric ring stop faces 8.13 and wedge segment stop faces 9.21. Because outer surfaces 8.11 of eccentric ring 8 extend correspondingly in a wedge shaped manner and because due to the configuration of wedge segments 9 inner surfaces 9.2 touch these outer surfaces 8.11 in the opposite direction, an optimal configuration of the wedge angle of wedge segments 9 is possible.

Eccentric ring 8 furthermore has a stop cam 8.3 having two radially oriented stop cam stop faces 8.31. Stop cam 8.3 is located on the periphery of eccentric ring 8 in a symmetric position with respect to edges 8.12 and eccentric ring stop faces 8.13 of eccentric ring 8 in a region that does not have wedge segments 9 superposed on it.

The installation of eccentric ring 8 and wedge segments 9 over and in bearing sleeves 5 and 7 and thus between the two fitting parts 4 and 6 has the consequence of there being an eccentricity. The eccentricity lies between the longitudinal axis, e.g., swivel axis of inclination adjustment fitting 1 (center axis of fitting part 4 attached to the seat back) and the center axis of circular through hole 6.1 of fitting part 6 fixed to the seat part. The eccentricity provides that outer toothing 6.2 will partially engage with inner toothing 4.2 in the direction of the eccentricity.

The inclination adjustment fitting 1 includes a driving disk 10. Driving disk 10 may be made of metal and may be produced as a stamped part. Driving disk 10 has a profile 10.1, corresponding to flange 2.3. for forming a shaft-hub connection. In the installed state, driving disk 10 is slid onto flange 2.3 so that it is unable to rotate. In the installed state, driving disk 10 is axially secured on driving hub 2, for example, by the extrusion of material of flange 2.3 toward driving disk 10.

Driving disk 10 furthermore has two driving components 10.2 (see, e.g., FIG. 2) revolving about a certain region. Driving components 10.2 may be manufactured in a deep drawing or press process. Driving disk 10 additionally has a driving recess 10.3, which accommodates a spring device 11, the construction and installation of which is described in more detail below.

Inclination adjustment fitting 1 illustrated in FIG. 1 has a spring device, e.g., a spring 11, which may be manufactured from a metal wire. Spring 11 has a shape corresponding to that of a butterfly. Spring 11 includes two bow-shaped side clips 11.1. Each of the two bow-shaped side clips 11.1 has a spring stud 11.2 projecting perpendicularly to its plane. Between the two bow-shaped side clips 11.1, there is an angularly bent wire transition section 11.3. Wire transition section 11.3 of spring 11 is used for fastening or hanging and supporting spring 11 on contact cam 8.4 on eccentric ring 8.

In FIG. 1, reference numeral 12 additionally represents or indicates, e.g., a conventional, protective cover. Protective cover 12 is used in the first instance for covering spring 11 and driving disk 10. Mainly, however, it is used to protect the hinge and toothed wheel regions of inclination adjustment fitting 1 against dirt, e.g., against the intrusion of foreign bodies.

In order to provide an engagement of inner toothing 4.2 and outer toothing 6.2 and the bearing of fitting parts 4 and 6 to be free from play, wedge segments 9 are acted upon by a spring 11. In the installed state, wire transition section 11.3 of spring 11 is supported within, e.g., on the inner side walls of contact cam 8.4 in eccentric ring 8. Spring studs 11.2 press on the end faces, e.g., spring end faces 9.4 of wedge segments 9 and effect an initial stress (see, e.g., FIG. 3). Contact cam 8.4, which, as already mentioned, has a U-shape, is located on eccentric ring 8 across from stop cam 8.3 and between outer surfaces 8.11, which receive wedge segments 9. Spring 11 is thus supported on eccentric ring 8 such that wedge segments 9 always have a defined position relative to eccentric ring 8. In this connection, wedge segments 9 are spring loaded with respect to eccentric ring 8.

In the installed state of inclination adjustment fitting 1, driving elements 10.2 engage into a space between eccentric ring 8 and outer bearing sleeve 7.

Figure 2:
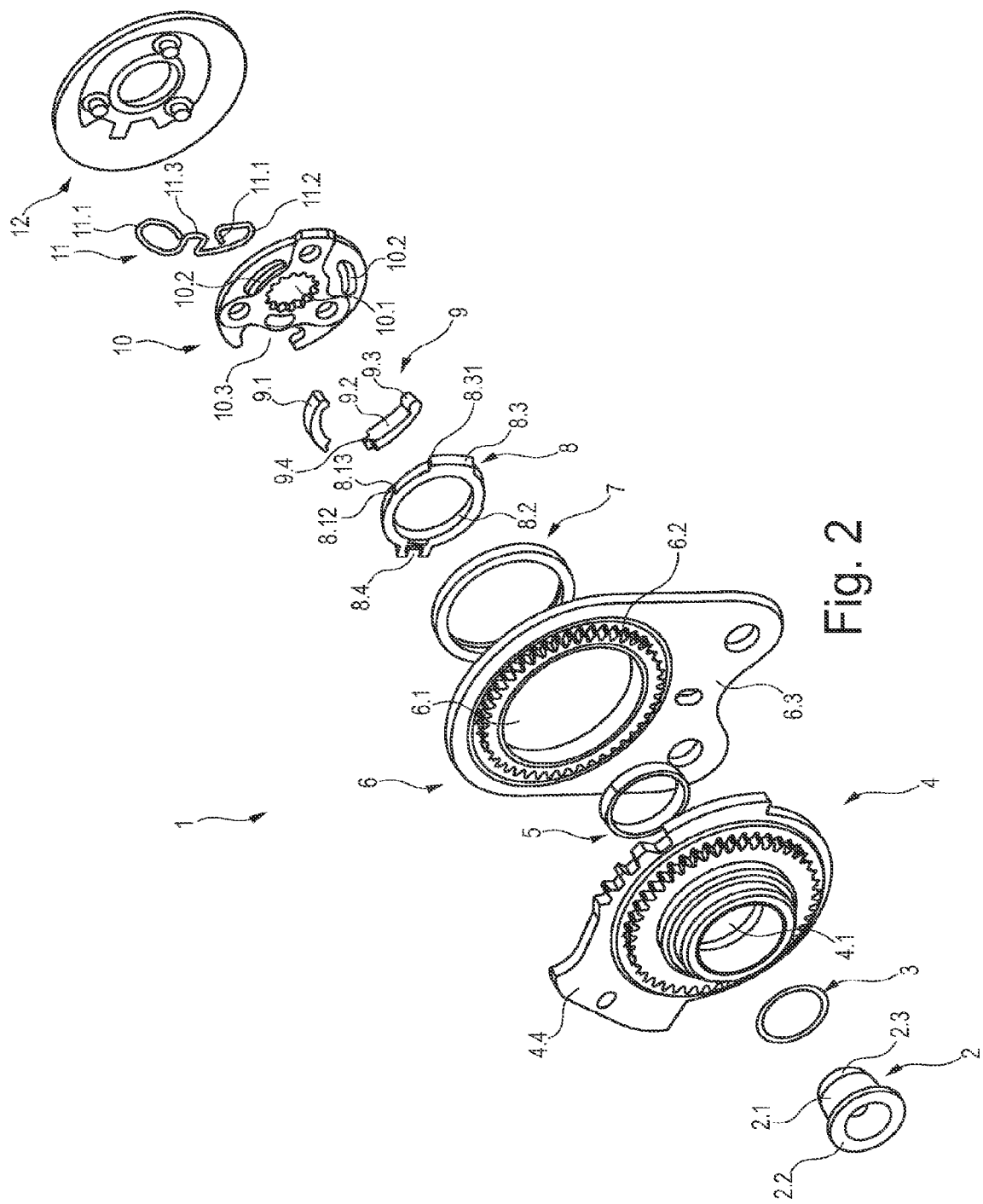
FIG. 2 is a perspective exploded view of an inclination adjustment fitting according to an example embodiment of the present invention.

FIG. 2 is another perspective exploded view illustrating the components of the inclination adjustment fitting 1 illustrated in FIG. 1, outer toothing 6.2 of fitting part 6 and pressed driving elements 10.2 of driving disk 10 being easily visible in this instance. The side of protective cover 12 facing fitting parts 4 and 6 is also illustrated.

Figure 3:
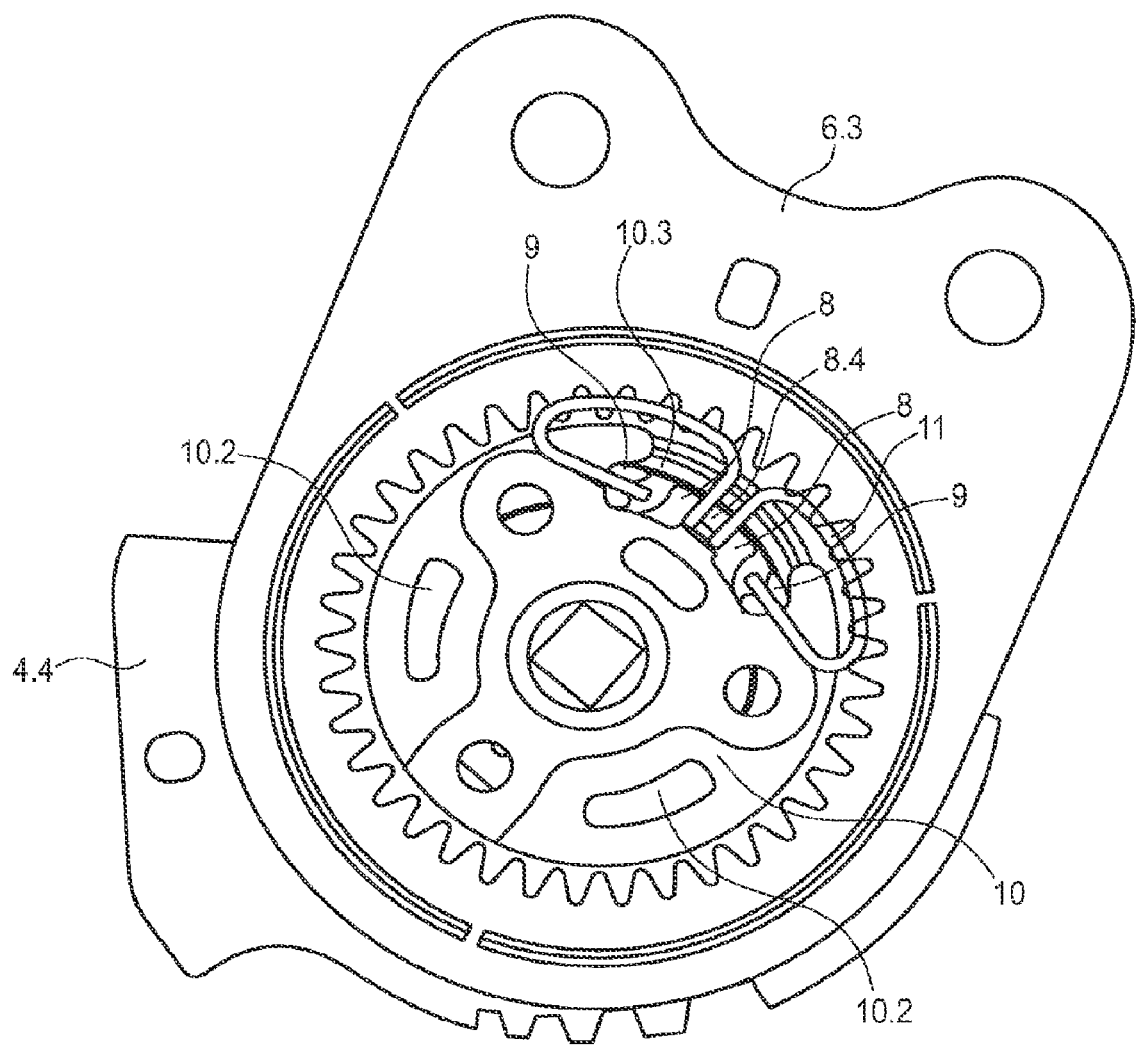
FIG. 3 is a top view of an inclination adjustment fitting according to an example embodiment of the present invention in an assembled state.

FIG. 3 is a top view of an inclination adjustment fitting 1 in the assembled state without protective cover 12. Spring 11 in the shape of a butterfly is in this case supported on the one hand via wire transition section 11.3 by contact cam 8.4 and with the aid of spring studs 11.2 presses wedge segments 9 apart. Since wedge segments 9 together with spring 11 pressing them apart do not form a relatively movable system with respect to eccentric ring 8, an increase of the eccentricity is achieved above all and play is avoided both in the bearing as well as in the toothing since there is no displacement of wedge segments 9 having spring 11.

What is claimed is:

1. An inclination adjustment fitting for a seat back of a vehicle seat, comprising:
   two fitting parts swivelably connected to each other via a wobble mechanism driven by an eccentric, the eccentric including an eccentric ring and two wedge segments arranged in mirror symmetry and set apart from each other, the wedge segments partially covering a circumference of the eccentric ring, the wedge segments pressed apart by a spring device acting against first end faces of the wedge segments to increase an eccentricity, the wedge segments arranged to be acted upon against a force of the spring device by driving components between second end faces of the wedge segments;
   wherein the spring device is supported on the eccentric ring such that the wedge segments occupy a defined position relative to the eccentric ring.

2. An inclination adjustment fitting for a seat back of a vehicle seat, comprising:
   two fitting parts swivelably connected to each other via a wobble mechanism driven by an eccentric, the eccentric including an eccentric ring and two wedge segments arranged in mirror symmetry and set apart from each other, the wedge segments partially covering a circumference of the eccentric ring, the wedge segments pressed apart by a spring device acting against first end faces of the wedge segments to increase an eccentricity, the wedge segments arranged to be acted upon against a force of the spring device by driving components between second end faces of the wedge segments;
   wherein the spring device is supported on the eccentric such that the wedge segments occupy a define position relative to the eccentric ring, and
   wherein the spring device includes two separate springs.

3. The inclination adjustment fitting according to claim 1, wherein the spring includes an individual spring having two spring shanks.

4. The inclination adjustment fitting according to claim 1, wherein the spring device has a butterfly shape.

5. The inclination adjustment fitting according to claim 1, wherein the spring device is fixed on a contact cam that extends into a gap between the wedge segments.

6. The inclination adjustment fitting according to claim 1, wherein a first one of the two fitting parts is connectable to a seat part of the vehicle seat and a second one of the two fitting parts is connectable to the seat back of the vehicle seat.

7. The inclination adjustment fitting according to claim 1, wherein a first one of the two fitting parts is connected to a seat part of the vehicle seat and a second one of the two fitting parts is connected to the seat back of the vehicle seat.

8. The inclination adjustment fitting according to claim 1, wherein a first one of the two fitting parts includes an external toothing and a second one of the two fitting parts includes an internal toothing engaging the external toothing, a number of teeth of the external toothing less than a number of teeth of the internal toothing.

9. A vehicle seat, comprising:
   a seat back; and
   an inclination adjustment fitting configured to adjust an inclination of the seat back, the inclination adjustment fitting including two fitting parts swivelably connected to each other via a wobble mechanism driven by an eccentric, the eccentric including an eccentric ring and two wedge segments arranged in mirror symmetry and set apart from each other, the wedge segments partially covering a circumference of the eccentric ring, the wedge segments pressed apart by a spring device acting against first end faces of the wedge segments to increase an eccentricity, the wedge segments arranged to be acted upon against a force of the spring device by driving components between second end faces of the wedge segments;
   wherein the spring device is supported on the eccentric ring such that the wedge segments occupy a defined position relative to the eccentric ring.

10. An inclination adjustment fitting for a seat back of a vehicle seat, comprising:
- a first fitting part;
- a second fitting part;
- a wobble mechanism;
- an eccentric, the first fitting part and the second fitting part swivelably connected to each other via the wobble mechanism driven by the eccentric, the eccentric including an eccentric ring and two wedge segments arranged in mirror symmetry and set apart from each other, the wedge segments partially covering a circumference of the eccentric ring;
- a spring device configured to act against first end faces of the wedge segments to press apart the wedge segments and to increase eccentricity; and
- driving components configured to act against second end faces of the wedge segments to act against a force of the spring device;
- wherein the spring device is supported on the eccentric ring such that the wedge segments occupy a defined position relative to the eccentric ring.

11. An inclination adjustment fitting for a seat back of a vehicle seat, comprising:
- a first fitting part;
- a second fitting part;
- a wobble mechanism;
- an eccentric, the first fitting part and the second fitting part swivelably connected to each other via the wobble mechanism driven by the eccentric, the eccentric including an eccentric ring and two wedge segments arranged in mirror symmetry and set apart from each other, the wedge segments partially covering a circumference of the eccentric ring;
- a spring device configured to act against first end faces of the wedge segments to press apart the wedge segments and to increase eccentricity; and
- driving components configured to act against second end faces of the wedge segments to act against a force of the spring device;
- wherein the spring device is supported on the eccentric such that the wedge segments occupy a defined position relative to the eccentric ring, and
- wherein the spring device includes two separate springs.

12. The inclination adjustment fitting according to claim 10, wherein the spring includes an individual spring having two spring shanks.

13. The inclination adjustment fitting according to claim 10, wherein the spring device has a butterfly shape.

14. The inclination adjustment fitting according to claim 10, wherein the spring device is fixed on a contact cam that extends into a gap between the wedge segments.

15. The inclination adjustment fitting according to claim 10, wherein the first fitting part is connectable to a seat part of the vehicle seat and the second fitting part is connectable to the seat back of the vehicle seat.

16. The inclination adjustment fitting according to claim 10, wherein the first fitting part is connected to a seat part of the vehicle seat and the second fitting part is connected to the seat back of the vehicle seat.

17. The inclination adjustment fitting according to claim 10, wherein the first fitting part includes an external toothing and the second fitting part includes an internal toothing engaging the external toothing, a number of teeth of the external toothing less than a number of teeth of the internal toothing.

* * * * *